UNITED STATES PATENT OFFICE.

JOHN KOPPITZ, OF BOSTON, AND FREDERIK B. MAYER, OF CAMBRIDGEPORT, MASSACHUSETTS.

IMPROVEMENT IN COLORING LEATHER.

Specification forming part of Letters Patent No. 142,797, dated September 16, 1873; application filed March 29, 1873.

*To all whom it may concern:*

Be it known that we, JOHN KOPPITZ, of Boston, of the county of Suffolk and State of Massachusetts, and FREDERIK B. MAYER, of Cambridgeport, of the county of Middlesex, of said State, have invented a new and useful Improvement in Coloring Leather or various other substances, and do hereby declare the same to be fully described as follows:

In carrying out our invention or process of coloring, we mix the ground color with starch; as, for instance, if we employ logwood as a ground color, we boil it in vinegar until the color is sufficiently extracted, and after having strained the solution we mix with it a quantity of starch, using generally, about a pound of starch to one quart of the solution, although the proportions are to be varied according to circumstances. For further coloring the leather we employ various aniline colors or pigments, and we prepare each as follows—that is to say, we first dissolve the color or pigment in alcohol—that is to say, we use for each ounce of the aniline pigment about one pint of alcohol. To this we add about three quarts of vinegar, and next boil the solution a few minutes. It is then ready for use. Next, the preparation of ground color is to be sprinkled on the leather, or the latter is to be covered with such preparation to the necessary extent, after which the other color or colors or preparation of aniline, as above explained, is to be sprinkled or thrown upon the leather to the extent required. The starch of the first preparation will cause it to resist the aniline color or colors, or second preparation, whereby there will result a softening or shading together of the spots of ground and other colors at their edges in contact. This softening or blending of the masses or spots of colors at their edges with the ground colors produces a very pleasing effect, and although the leather has an appearance much like that of marbled paper, used in book-binding, no bath is required to produce the effect, as in the process of marbling paper. Furthermore, the preparation of the aniline color, by the employment of alcohol and vinegar, in manner as described, renders the color stable, or not easily oxidizable by light, the preparation being peculiarly fitted for coloring leather with one plain color without first employing a ground color prepared with starch, as set forth.

We would observe that, generally speaking, whenever the ground color prepared with starch, as explained, becomes covered with the aniline color, the latter becomes readily removable by water, so that, after a skin may have been sprinkled with the ground and aniline dyes or colors, and is afterward washed, the aniline colors will remain fast in such portions of the skin not covered by the ground or starch color, but will be mostly if not entirely removed from the parts on which the starch color or ground may have been thrown.

By our process and means, as set forth, we are able to color leather or other substances for use in the arts with great economy, and with excellent practical and ornamental results.

We make no claim to the method of preparing colors from aniline, as described in Letters Patent No. 46,804, dated March 14, 1865, and granted to Xavier Karcheski, such covering a white base mixed with starch-water, a solution of tannic acid, and a solution of aniline with fresh milk or dissolved glue.

We claim as our invention as follows, viz:

1. The employment for the purpose, and substantially as described, of ground and aniline colors, prepared in manner and by means as explained.

2. The combination or solution of an aniline pigment, alcohol, and vinegar prepared by heat, as set forth.

3. The employment, on a surface of starch, in a colored solution to resist a solution of aniline when applied to such surface, essentially as specified.

JOHN KOPPITZ.
FREDERIK BUCK MAYER.

Witnesses:
R. H EDDY,
J. R. SNOW.